United States Patent
Oklejas, Jr. et al.

(10) Patent No.: US 9,435,441 B2
(45) Date of Patent: Sep. 6, 2016

(54) ANTI-CAVITATION THROTTLE VALVE AND METHOD OF OPERATING THE SAME

(71) Applicant: Fluid Equipment Development Company, LLC, Monroe, MI (US)

(72) Inventors: Eli Oklejas, Jr., Newport, MI (US); Jason B. Hunt, Monroe, MI (US)

(73) Assignee: Fluid Equipment Development Company, LLC, Monroe, MI (US)

(*) Notice: Subject to any disclaimer, the term of this patent is extended or adjusted under 35 U.S.C. 154(b) by 209 days.

(21) Appl. No.: 14/177,597

(22) Filed: Feb. 11, 2014

(65) Prior Publication Data

US 2014/0224343 A1    Aug. 14, 2014

Related U.S. Application Data

(60) Provisional application No. 61/763,125, filed on Feb. 11, 2013.

(51) Int. Cl.

| | |
|---|---|
| *F16K 31/42* | (2006.01) |
| *F16K 3/24* | (2006.01) |
| *F16K 31/124* | (2006.01) |
| *F16K 47/08* | (2006.01) |
| *F16K 31/122* | (2006.01) |

(52) U.S. Cl.
CPC .............. *F16K 3/24* (2013.01); *F16K 31/122* (2013.01); *F16K 31/124* (2013.01); *F16K 47/08* (2013.01); *Y10T 137/0368* (2015.04); *Y10T 137/7758* (2015.04)

(58) Field of Classification Search
CPC ........ F16K 3/24; F16K 31/124; F16K 47/08; Y10T 137/7758; Y10T 137/0368; Y10T 137/7759; Y10T 137/7761; Y10T 137/7768

USPC ........ 137/486, 487.5, 489.5, 10, 564.5, 485; 251/118, 127

See application file for complete search history.

(56) References Cited

U.S. PATENT DOCUMENTS

| | | | | |
|---|---|---|---|---|
| 3,588,037 | A | * | 6/1971 | Ritchie ................... F16K 25/04 137/625.69 |
| 3,820,556 | A | * | 6/1974 | Millar .................... G05D 7/014 137/220 |
| 3,853,146 | A | * | 12/1974 | Blair ....................... F01K 25/04 137/625.3 |
| 3,856,049 | A | * | 12/1974 | Scull ................. F16L 55/02781 138/37 |
| 4,333,486 | A | * | 6/1982 | Ciccozzi ............. G05D 7/0635 137/1 |
| 4,397,331 | A | * | 8/1983 | Medlar ................... F16K 47/02 137/375 |
| 4,431,020 | A | * | 2/1984 | Kowalski ................ F16K 1/123 137/110 |
| RE32,197 | E | * | 7/1986 | Self .......................... F15D 1/14 137/549 |
| 4,617,963 | A | * | 10/1986 | Stares ..................... F16K 47/08 137/625.3 |

(Continued)

*Primary Examiner* — Eric Keasel
*Assistant Examiner* — Minh Le
(74) *Attorney, Agent, or Firm* — Harness, Dickey & Pierce, P.L.C.

(57) ABSTRACT

A throttle housing having an inlet end and an outlet end includes a shuttle housing disposed within the throttle housing. The shuttle housing has a first end cap at a first end and an orifice array therethrough. The shuttle housing comprises a shuttle housing therein. The shuttle has an opened position and a closed position relative to the shuttle housing. The shuttle defines a varying control volume between the end cap, the shuttle and the shuttle housing. The control inlet fluidically communicates a control fluid to the control volume to control the position of the shuttle in the shuttle housing.

18 Claims, 5 Drawing Sheets

(56) References Cited

U.S. PATENT DOCUMENTS

| | | | | |
|---|---|---|---|---|
| 4,756,334 A * | 7/1988 | Panet | F16K 15/026 | 137/514.3 |
| 4,986,512 A * | 1/1991 | Tiefenthaler | F16K 39/022 | 137/509 |
| 5,124,934 A * | 6/1992 | Kawamoto | G05D 7/0635 | 222/14 |
| 5,660,198 A * | 8/1997 | McClaran | G05D 16/106 | 137/10 |
| 5,687,759 A * | 11/1997 | Tan | F16K 31/402 | 137/486 |
| 6,584,999 B2 | 7/2003 | Inayama | G05D 16/2093 | 137/102 |
| 7,069,950 B1 * | 7/2006 | Bittner | F16K 47/08 | 137/625.37 |
| 7,353,837 B2 * | 4/2008 | Biester | F16K 1/12 | 137/219 |
| 7,448,409 B2 * | 11/2008 | Micheel | F16K 3/246 | 137/625.37 |
| 7,690,400 B2 * | 4/2010 | Haines | F16K 47/08 | 137/625.3 |
| 8,714,560 B2 * | 5/2014 | Faas | F16J 15/3236 | 137/625.3 |
| 8,800,599 B2 * | 8/2014 | Betting | B01D 17/045 | 137/219 |
| 2003/0226600 A1 * | 12/2003 | Stares | F16K 47/08 | 137/625.3 |
| 2009/0183790 A1 * | 7/2009 | Moore | B22F 3/1055 | 137/597 |
| 2013/0320252 A1 * | 12/2013 | Hageman | F16K 3/246 | 251/324 |
| 2014/0090725 A1 * | 4/2014 | Diaz | F16K 17/00 | 137/489.5 |
| 2014/0150901 A1 * | 6/2014 | Mesner | F16K 31/42 | 137/487.5 |
| 2015/0041690 A1 * | 2/2015 | McCaskill | E21B 34/02 | 251/127 |
| 2015/0108379 A1 * | 4/2015 | Juhnke | F16K 3/34 | 251/127 |

* cited by examiner

ANTI-CAVITATION THROTTLE VALVE AND METHOD OF OPERATING THE SAME

CROSS-REFERENCE TO RELATED APPLICATIONS

This application claims the benefit of U.S. Provisional Application No. 61/763,125 filed on Feb. 11, 2013. The disclosure of the above application is incorporated herein by reference.

TECHNICAL FIELD

The present disclosure relates generally to throttle valves, and, more specifically, to a throttle valve that reduces cavitation and is relatively safe to operate.

BACKGROUND

The statements in this section merely provide background information related to the present disclosure and may not constitute prior art.

Fluid machines are used in many applications for many processes. Providing the proper amount of fluid to a device is important. Throttle valves are used to control the amount of fluid provided to a particularl device or machine. Ball or globe valves are typically used for throttle valves.

Conventional throttle valves are undesirable for many reasons. For example, the valve stem and packing assembly may be ejected if the valve fails internally. Throttle valves are also prone to cavitation. The formation of vapor bubbles in the stream accelerates erosion.

Throttle valves also typically use a form of mechanical seal or packing that allows the valve stem to move freely. The seal is exposed to the process fluid on one side and atmosphere on the other. Minor seal leakage allows the fluid to leak into the atmosphere.

Conventional throttle valves are also relatively expensive because parts are typically cast and also require complex and expensive external actuators.

Further areas of applicability will become apparent from the description provided herein. It should be understood that the description and specific examples are intended for purposes of illustration only and are not intended to limit the scope of the present disclosure.

SUMMARY

This section provides a general summary of the disclosure, and is not a comprehensive disclosure of its full scope or all of its features.

The present disclosure provides a throttle valve and method for operating the same that reduces safety hazards. The present disclosure also provides a valve that protects upstream equipment and is relatively inexpensive to manufacture.

In one aspect of the disclosure, a throttle housing having an inlet end and an outlet end includes a shuttle housing disposed within the throttle housing. The shuttle housing has a first end cap at a first end and an orifice array on a second end. The shuttle housing comprises a shuttle housing therein. The shuttle has an opened position and a closed position relative to the shuttle housing. The shuttle defines a varying control volume between the end cap, the shuttle and the shuttle housing. The control inlet fluidically communicates a control fluid to the control volume to control the position of the shuttle in the shuttle housing.

In another aspect of the disclosure, a method of operating a throttle valve having a control volume between a shuttle, a shuttle housing and an end cap of the shuttle housing is set forth. The shuttle is disposed within the shuttle housing. The shuttle exposes an orifice array in the shuttle housing. The method includes generating a flow signal from another control. The method further includes when the process variable signal is above a first control point, communicating fluid from the throttle valve input to the control volume, moving the shuttle toward a throttle valve output and reducing flow through the orifice array. The method further includes when the process variable signal is below a second control point, communicating fluid from the throttle valve output to the control volume, moving the shuttle toward the throttle valve input and increasing flow through the orifice array.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
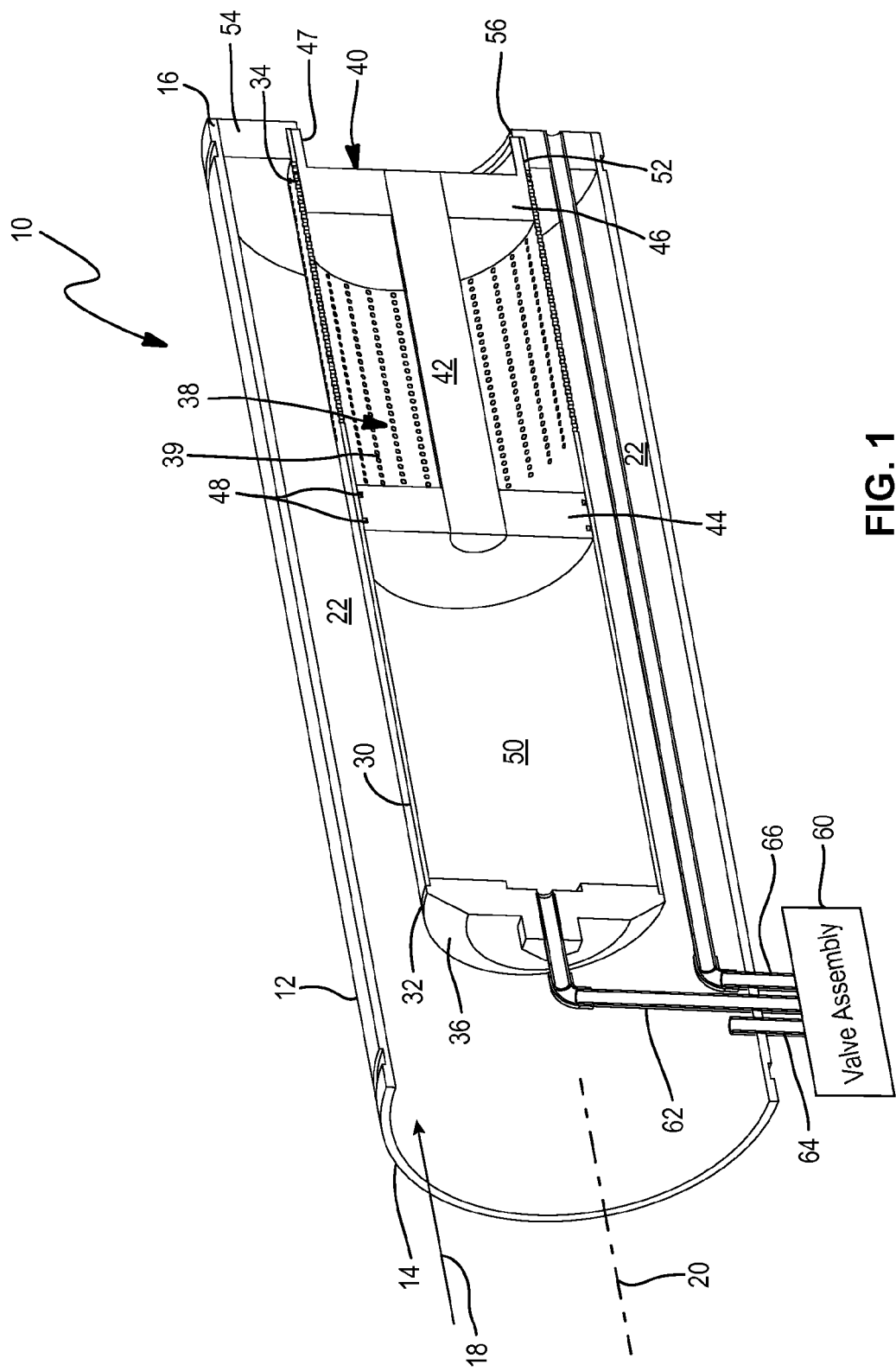
FIG. 1 is a cross-sectional perspective view of a throttle valve assembly according to the present disclosure.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, a throttle valve assembly 10 is illustrated. The throttle valve assembly has a housing 12 that has a first or inlet end 14 and a second or outlet end 16. Fluid generally flows through the valve assembly 10 in an axial direction illustrated by the arrow 18. The housing 12 has a shuttle housing 30 disposed therein. The shuttle housing 30 may be coaxial with a longitudinal axis 20 of the housing 12. The shuttle housing 30 has a diameter less than the internal diameter of the housing 12. This forms an axially extending space or channel 72 between the shuttle housing 30 and the throttle housing 12. Fluid from the valve inlet end 14 flows into the channel 22 and ultimately into the shuttle housing as will be described in greater detail below. The shuttle housing 30 has a first end 32 and a second end 34. The first end 32 is disposed toward the inlet end 14. The second end 34 is disposed near the outlet end 16.

The inlet end 32 has an end cap 36 disposed therein. The second end 34 has an orifice array 38. In this example, the orifices 39 and the orifice array 38 are arranged in axially extending lines spaced apart around the circumference of the shuttle housing 30. The orifices are regularly spaced apart. However, the pattern of the orifice array 38 may not be regular depending upon the desired output conditions. For example, more array openings may be placed toward the downstream end or upstream end depending on the desired operating characteristics. If non-linear operating characters are desired, then the amount of holes in the orifice array may vary.

The shuttle housing 30 has a shuttle 40 disposed therein. The shuttle 40 has a first arm 42 having a first arm end with a first piston 44 and a second arm end with a second piston 46. The shuttle assembly 40 moves in an axial direction as will be further described below. The second piston 46 may have extensions 47 thereon. The extensions increase the area blocking the orifice array 38.

The first piston 44 may have a plurality of piston rings 48 disposed thereon. The piston rings 48 sealingly engage against the housing 30 to prevent fluid from a control volume 50 defined within the shuttle housing 30. The control volume 50 is disposed within the shuttle housing 30 between the end cap 36 and the first piston 44. By controlling the amount of fluid within the control volume 50, the axial position of the shuttle assembly 40 may be controlled. When the second piston 46 moves in an axial direction, various amounts of orifices 39 within the array 38 are exposed. As mentioned above, the whole orifice array 38 may be exposed when the shuttle assembly 40 is in the leftmost (or upstream) position according to FIG. 1. The leftmost position corresponds to the inlet end 14 of the housing 12. When the shuttle assembly 40 is in the rightmost position or biased toward the outlet end 16, no orifices in the orifice array 38 have fluid moving therethrough.

The second piston 46 may have a coating 52 disposed thereon. The coating 52 may be Teflon® or other lubricating material to allow the second piston 46 to move smoothly to various positions.

The housing 12 may also include a valve end cap 54 that fills the radial space between the housing 12 and the shuttle housing 30. Fluids must pass through the orifice array 38 to pass out of the outlet end 16.

The end cap 54 may have a stop 56 that receives the extension 47 of the piston 46. The stop 56 prevents the movement of the shuttle assembly 40 in an axial direction toward the outlet end 16 of the valve assembly 10. When the shuttle assembly is near or against the stop 56, the valve 10 is closed.

A valve assembly 60 is used to selectively couple a control inlet 62 to provide fluid within the control volume 50. The control inlet 62 is selectively coupled to fluid from the inlet end 14 of the throttle assembly 10 through a first inlet 64 or to fluid from the outlet end 16 through a second inlet 66. The second inlet 66 extends through the end cap 36 to communicate fluid therethrough.

Figure 2:
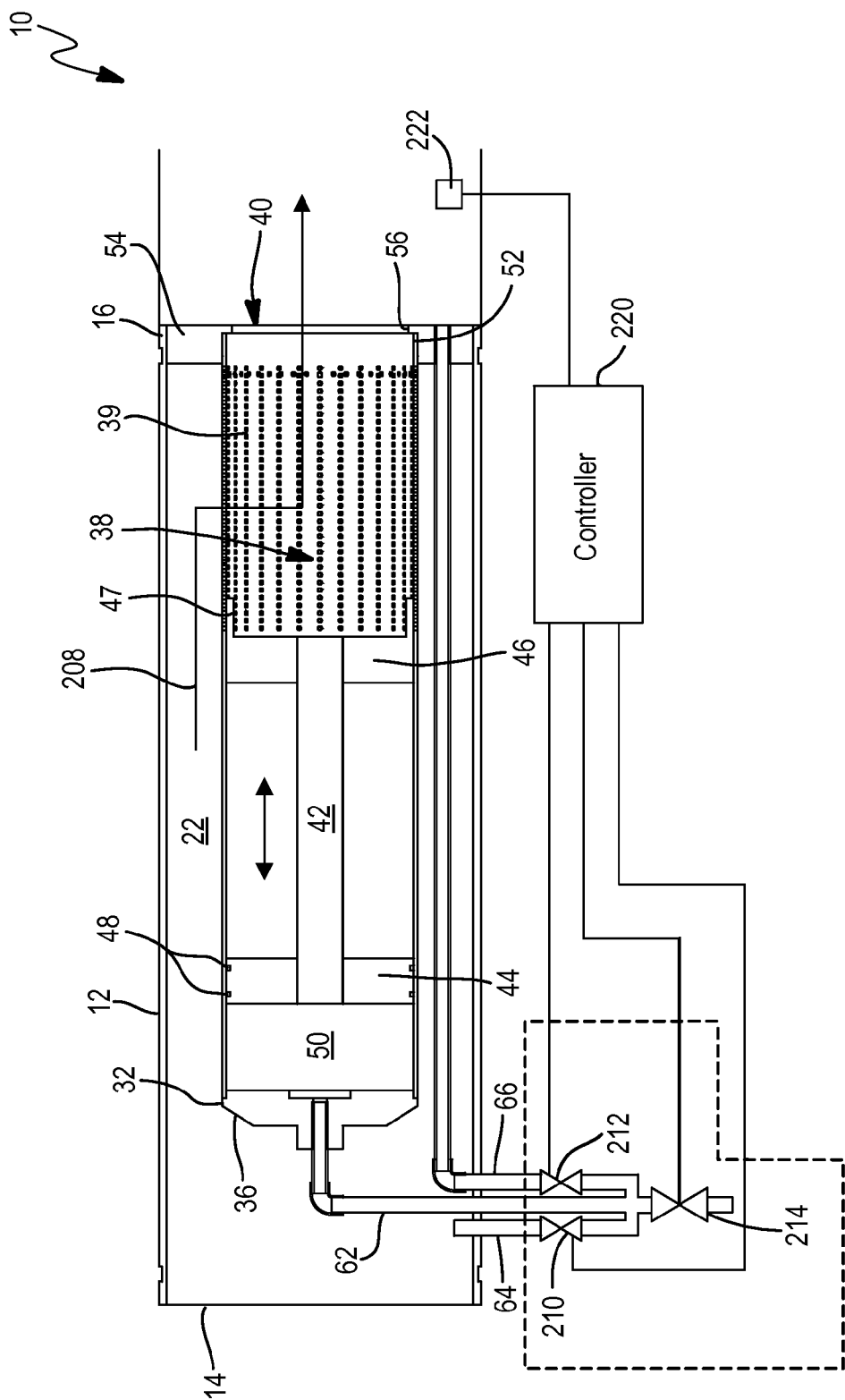
FIG. 2 is a cross-section of a throttle valve having the shuttle within a first position.

Referring now to FIG. 2, the shuttle assembly 40 is illustrated in a leftmost position exposing a maximum number of the orifices 39 in the orifice array 38 to the outlet end. The arrow 208 shows the fluid flow direction. The valve assembly 60 is illustrated in further detail. The valve assembly 60 includes a first valve 210, a second valve 212 and an optional third valve 214. A controller 220 controls the valves 210-214 in response to a flow signal from a flow sensor 222. The flow sensor 222 may generate a flow signal corresponding to the flow of fluid through the outlet end of the throttle valve 10.

The first valve 210 couples fluid from the near inlet end 14 to the control inlet 62 and ultimately to the control volume when opened. Typically, one valve 210-214 is open at any one time. The pressure in the control volume 50 is increased.

The second valve 212, when opened, provides fluid from near the control volume 50 through the control inlet 62 and to near the outlet 16. The pressure in the control volume 50 is reduced due to the lower pressure near the outlet 16.

Valve 214 exposes the system to atmospheric pressure when opened. That is, the atmospheric pressure is provided through the control inlet 62 when opened. This may be used to flush the system or rapidly change the direction or position of the shuttle assembly 40 toward the opened position.

The valves 210-212 and 214 may be solenoid actuated valves that are relatively inexpensive.

Figure 3:
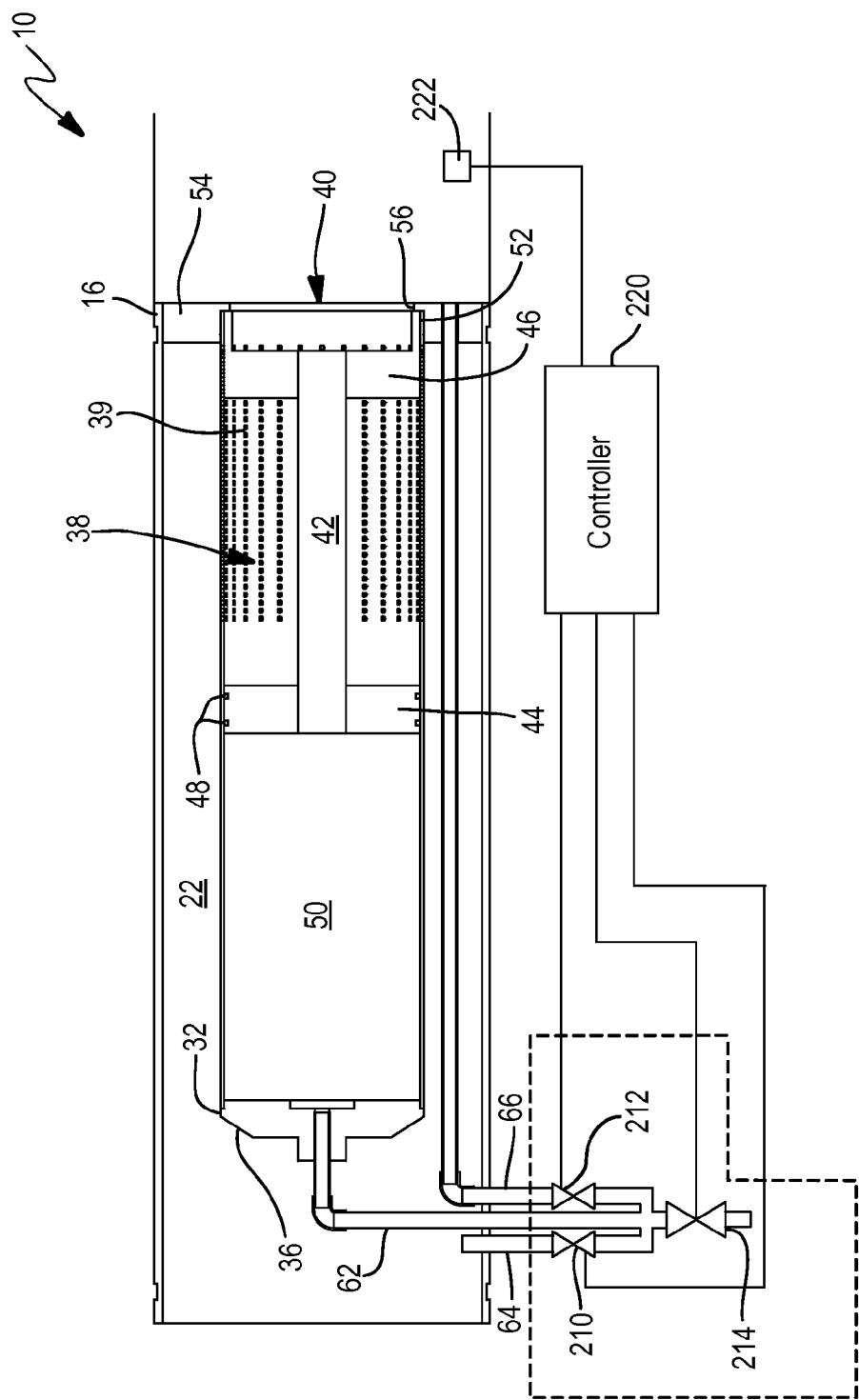
FIG. 3 is a cross-sectional view of a throttle assembly having the throttle in a second position.

Referring now to FIG. 3, the same components are labeled with the same reference numerals from those described above with respect to FIGS. 1 and 2. In this example, the throttle valve assembly 10 is illustrated in a closed position. That is, the throttle valve assembly 10 has the shuttle 40 in the rightmost position so that the second piston 46 prevents flow of fluid through the orifice array 38.

The shuttle positions between FIGS. 2 and 3 may be referred to as intermediate positions. In such intermediate positions the throttle valve is partially opened allowing for some of the orifices to have fluid flow therethrough.

Figure 4:
FIG. 4 is a diagrammatic illustration of control points used for controlling the valves of the present disclosure.

Referring now to FIG. 4, an example of a first control point 410, a second control point 412 and a deadband 414 are illustrated. The first control point and the second control point correspond to two different flow rates that are separated by the deadband 414. When the flow rate in the flow rate signal from the flow sensor is below the first control point, the second valve is opened and the first valve is closed and the third valve is closed. When the flow rate is above the second control point 412, the first valve is opened, the second valve is closed and the third valve is closed. When the flow rate is within the deadband, both the first valve and the second valve are closed to maintain the position of the shuttle assembly.

In some embodiments, the deadband 414 may be eliminated causing the first control point 410 and the second control point 412 to be equal.

The first control point 412 and the second control point 414 are chosen based upon the input to the equipment downstream of the throttle valve 10. As mentioned above, the flow rate may be manipulated to form a linear or non-linear response by controlling the position and number of orifices 39 in the orifice array 38 illustrated in FIGS. 1-3.

Figure 5:
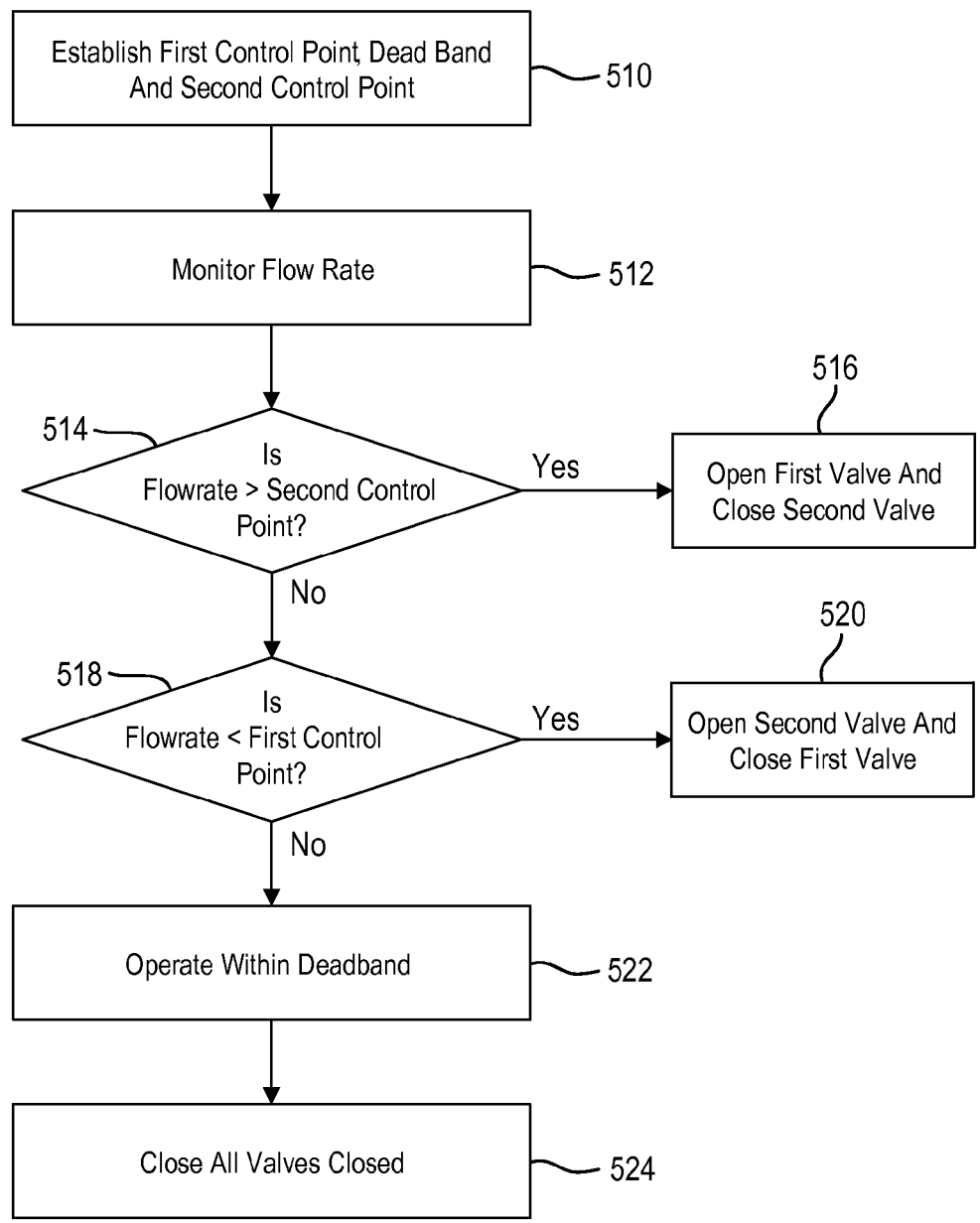
FIG. 5 is a flowchart of a method of operating the throttle valve of FIGS. 1-3.

Referring now to FIG. 5, a method of operating a system is set forth. In step 510, the first control point, second control point and the deadband (if used) are established based upon the downstream equipment and the desired flow rates for the equipment. Often times, the amount of flow rate will change depending upon the operating characteristics of the system. In a reverse osmosis system, the flow rate may decrease over time due to fouling of the membrane for example.

In step 512, the flow rate is monitored at the controller. In step 514, if the flow rate is above the second control point, the first valve is opened in step 516. If the flow rate is below the first control point in step 518, step 520 opens the second valve and closes the first valve. It should be noted that in both steps 516 and 520, the third valve is closed.

Referring back to step 518, when the flow rate is not below the first control point and the flow rate is not above the second control point, this is an indication that the system is operating within the deadband in step 522 and all valves in the system are closed.

When rapid movement of the system or flushing of the system is desired, the third valve is opened and the first and second valves are closed.

In this manner, the position of the shuttle assembly 40 is changed to expose various amounts of the orifices 39 in the orifice array 38 to allow fluid to be communicated from the inlet end 14 to the outlet end 16.

As will be recognized to those skilled in the art, the assembly of the throttle valve is relatively simply in that no castings are required. Tube stock may be used for the housing 12 and 30. Should the moving portions of the valve (the shuttle 40) break, fluid will remain in the closed system and not be communicated outside of the valve assembly into the environment. The moving valve components (the shuttle 40) are also contained within the system and present no safety hazards in the event of failure.

The throttle valve assembly 10 is also easily adjustable during fabrication to provide various curves of flow rates depending upon the position and number of orifices 39 within the orifice array 38. Orifices closer to the left side may be fewer in number compared to orifices 39 on the right side to provide a non-linear distribution.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A throttle valve for communicating fluid comprising:
a throttle housing having an inlet end and an outlet end;
a shuttle housing disposed within the throttle housing, said shuttle housing having a first end cap at a first end and, at a second end, an orifice array having a plurality of openings therethrough, said shuttle housing comprising a shuttle therein, said shuttle comprising a first piston and a second piston spaced apart by an arm, said shuttle having an opened position and a closed position relative to the shuttle housing, said shuttle defining a varying control volume between the end cap, the first piston and the shuttle housing and said second piston varying the amount of flow through the plurality of openings in the orifice array through which fluid is communicated into the shuttle housing and into the outlet end; and
a control inlet fluidically communicating a control fluid to the control volume to control the position of the shuttle in the shuttle housing wherein the control fluid is controlled through a valve assembly comprising a first valve selectively communicating fluid from a high pressure source to the control inlet and a second valve selectively communicating fluid from a low pressure source to the control inlet.

2. The throttle valve as recited in claim 1 wherein fluid flowing through the first valve flows from the inlet end through the control inlet and fluid flowing through the second valve flows from the outlet end to the control inlet.

3. The throttle valve as recited in claim 2 further comprising a flow sensor disposed proximate the outlet end, said flow sensor generating a flow signal.

4. The throttle valve as recited in claim 3 wherein the flow signal comprises a flow rate signal.

5. The throttle valve as recited in claim 3 further comprising a controller coupled to the first valve and the second valve, said controller controlling the first valve and the second valve in response to the flow signal.

6. The throttle valve as recited in claim 5 wherein the controller opens the first valve and closes the second valve when the flow is greater than a first control point.

7. The throttle valve as recited in claim 6 wherein the controller closes the first valve and opens the second valve when the flow is less than a second control point.

8. The throttle valve as recited in claim 7 wherein the controller closes the first valve and closes the second valve when the flow is within a deadband between the first control point and the second control point.

9. The throttle valve as recited in claim 7 wherein the first control point coincides with the second control point.

10. The throttle valve as recited in claim 5 further comprising a third valve in communication with the controller coupling the control inlet to atmospheric pressure.

11. The throttle valve as recited in claim 1 wherein the second piston has a plurality of intermediate positions wherein the array is partially obstructed by the second piston.

12. A method of operating a throttle valve having a control volume between a first piston of a shuttle, a shuttle housing and an end cap of the shuttle housing, said shuttle disposed within the shuttle housing, said shuttle comprising an arm having the first piston at a first end and a second piston at a second end thereof, said shuttle exposing varying amounts of an orifice array through the shuttle housing comprising:
generating a flow signal from a flow sensor in a throttle valve output;
when the flow signal is above a first control point, communicating fluid from a throttle valve input to the control volume, moving the shuttle toward the throttle valve output and reducing flow through the orifice array by moving the second piston to block a portion of he orifice array;
when the flow signal is below a second control point, communicating fluid from the throttle valve output to the control volume, moving the shuttle toward the throttle valve input and increasing flow through the orifice array by moving the second piston to increase the portion of the orifice array; and
when the flow signal is between the first control point and the second control point, maintain the position of the shuttle within the shuttle housing.

13. The method as recited in claim 12 wherein the first control point and the second control point are equal.

14. The method as recited in claim 12 wherein communicating fluid from the throttle valve input to the control volume comprises opening a first valve and closing a second valve.

15. The method as recited in claim 14 wherein communicating fluid from the throttle valve output to the control volume comprises opening the second valve and closing the first valve.

16. The method as recited in claim 12 further comprising when the flow signal is between the first control point and the second control point, closing flow to the control volume.

17. A throttle valve comprising:
a throttle housing having an inlet end and an outlet end;
a shuttle housing disposed within the throttle housing, said shuttle housing having a first end cap at a first end and an orifice array having a plurality of openings therethrough, said shuttle housing comprising a shuttle therein, said shuttle having an opened position and a closed position relative to the shuttle housing, said shuttle defining a varying control volume between the end cap, the shuttle and the shuttle housing and varying the amount of flow through the plurality of openings in the orifice array;

a control inlet fluidically communicating a control fluid to the control volume to control the position of the shuttle in the shuttle housing wherein the control fluid is controlled through a valve assembly comprising a first valve selectively communicating fluid from a high pressure source to the control inlet and a second valve selectively communicating fluid from a low pressure source to the control inlet;

wherein fluid flowing through the first valve flows from the inlet end through the control inlet and fluid flowing through the second valve flows from the outlet end to the control inlet;

a flow sensor disposed proximate the outlet end, said flow sensor generating a flow signal;

a controller coupled to the first valve and the second valve, said controller controlling the first valve and the second valve in response to the flow signal; and a third valve in communication with the controller coupling the control inlet to atmospheric pressure.

18. A throttle valve comprising:

a throttle housing having an inlet end and an outlet end;

a shuttle housing disposed within the throttle housing, said shuttle housing having a first end cap at a first end and an orifice array having a plurality of openings therethrough, said shuttle housing comprising a shuttle therein, said shuttle having an opened position and a closed position relative to the shuttle housing, said shuttle defining a varying control volume between the end cap, the shuttle and the shuttle housing and varying the amount of flow through the plurality of openings in the orifice array;

a control inlet fluidically communicating a control fluid to the control volume to control the position of the shuttle in the shuttle housing wherein the control fluid is controlled through a valve assembly comprising a first valve selectively communicating fluid from a high pressure source to the control inlet and a second valve selectively communicating fluid from a low pressure source to the control inlet;

wherein fluid flowing through the first valve flows from the inlet end through the control inlet and fluid flowing through the second valve flows from the outlet end to the control inlet;

a flow sensor disposed proximate the outlet end, said flow sensor generating a flow signal;

a controller coupled to the first valve and the second valve, said controller controlling the first valve and the second valve in response to the flow signal;

wherein the controller closes the first valve and opens the second valve when the flow is less that than a second control point; and wherein the controller closes the first valve and closes the second valve when the flow is within a deadband between the first control point and the second control point.

* * * * *